Dec. 20, 1955  J. ROBINSON  2,727,329
WEEDLESS FISH LURE
Filed March 17, 1953
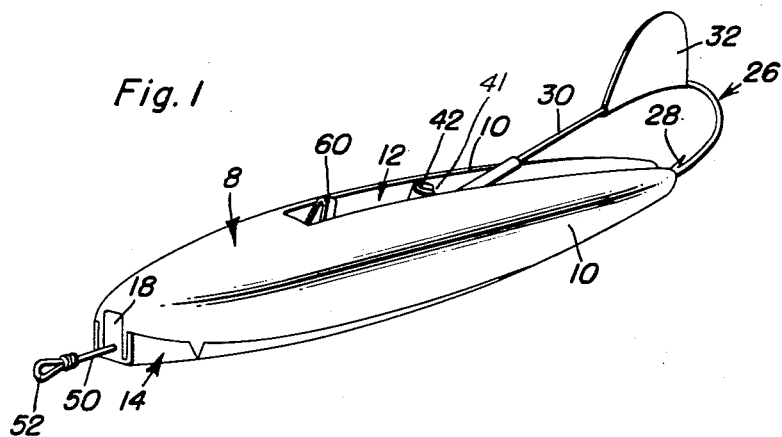
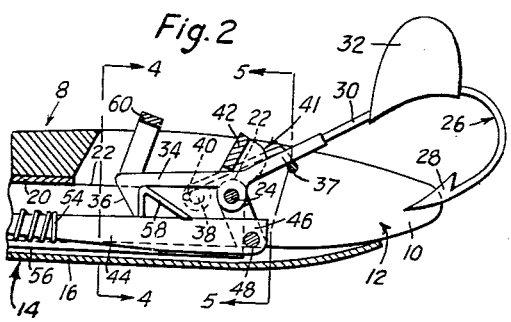
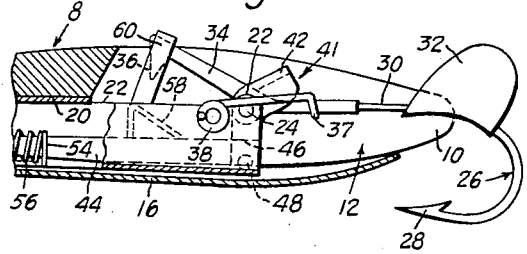
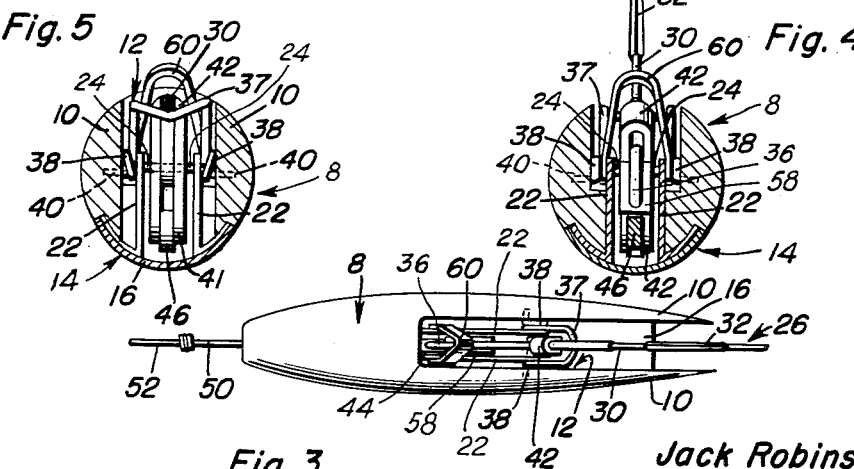
Jack Robinson
INVENTOR.
BY Clarence A. O'Brien
and Harvey B. Jackson
Attorneys

United States Patent Office 2,727,329
Patented Dec. 20, 1955

2,727,329

WEEDLESS FISH LURE

Jack Robinson, Saint Maries, Idaho, assignor to Thomas G. Hodgson, Don C. Hodgson, and Myron J. Hodgson, Benewah County, Idaho Application March 17, 1953, Serial No. 342,800

6 Claims. (Cl. 43—35)

The present invention relates to structural and functional improvements in a so-called weedless-type fishing lure which is characterized by a buoyant plug and a pivotally mounted fishhook the bill or barb portion of which is normally confined and secluded in a sheath-forming-slot in said plug and is pull actuated so that it is projected from its place of seclusion and is forcibly thrust into the mouth of the fish to make the catch in a well known manner.

An object of the invention is to provide a projectable and retractible hook construction which may be readily towed or drawn through weed and brush infested areas without snagging and is effectually cocked and is thus readied to successfully make the desired catch.

The invention relates to a buoyant plug bifurcated at its trailing end with the furcations defining a hook barb receiving and secluding slot, a fishhook having a shank pivotally mounted for operation in said slot, spring means anchored to and supported between the furcations and cooperating with said shank and serving to lift the shank to a position wherein the hook bill portion is normally housed and secluded in the slot between said furcations, a push-pull link slidably mounted in said plug and having a line attaching eye at its leading end, a trip member pivotally mounted between said furcations adjacent to and operatively engageable with the pivoted end of said shank, the adjacent trailing end of said push-pull link being hingedly joined to said trip member so that when said link is released and a pull is exerted on the line, the link is slid toward the leading end of the plug, said trip member swings in an arc, engages and then exerts a downwardly applied force on the shank to overcome the retentive lifting force of said spring means, whereby the hook is then swung down and is thus projected from its place of seclusion in the slot to an extended as well as exposed fish trapping position below the ventral surface of said plug.

Other objects, features and advantages will become more readily apparent from the following description and the accompanying sheet of drawings.

In the accompanying drawings wherein like numerals are employed to designate like parts throughout the views:

Figure 1 is a perspective view of the weedless fish lure of the present invention, the fishhook being shown in its normal shielded or secluded but cocked and ready-to-function position.

Figure 2 is an enlarged fragmentary central longitudinal sectional view through the same with parts appearing in elevation and showing the latched position which is taken by the hook when it is set or cocked for use.

Figure 3 is a top plan view of the same.

Figures 4 and 5 are enlarged cross-sections taken on the lines 4—4 and 5—5 respectively of Figure 2, looking in the direction of the directional arrows.

Figure 6 is a fragmentary sectional and elevational view, based on Figure 2, and showing the relative relationship of the parts after the fish hook has been released and projected to the position required to make the catch.

Referring now to the drawings the numeral 8 designates the plug proper. The latter may be of any appropriate buoyant material, suitably colored and appropriately shaped to meet the requirements in fishing for game fish. The ventral or bottom side of the plug is slotted and made hollow to accommodate the parts and mechanism. The median and rear portion may be said to be bifurcated to define spaced parallel furcations 10—10 and an intervening mechanism accommodation slot 12. A sheet metal or equivalent shield or armor is provided and this is denoted, generally, by the numeral 14 and it covers the bottom of the hollow front portion and also the major bottom portion of slot 12. This may be called a cover portion 16 and it is perhaps best shown in Figures 2, 4, 5 and 6. The forward end portion of the shield 14 includes an apertured ear 18 which closes the leading end of the plug. The hollow portion is also lined as at 20 in Figure 2. Extending into the slot 12 are upstanding walls or support members in spaced parallelism denoted by the numerals 22—22 (see Figures 4 and 5) and these walls serve to support a transverse shaft 24 which partially spans the space between said walls. The fishhook is denoted generally by the numeral 26 and it has the usual curvate end terminating in a bill or barb 28 and a shank 30 with an attraction fin 32. The shank is pivoted on the shaft 24, as best shown in Figures 2 and 6, and has an extension 34 which terminates in a hook-like detent 36. The portions 34 and 36 form a latch which serves in a manner to be described. It is desired to retain the bill 28 in the secluded position in the slot 12 as shown in Figure 2 and this is accomplished through the medium of an approximately U-shaped spring 37. The bight portion of the spring 37 is laterally offset and said bight portion is disposed underneath of the adjacent pivoted end of the shank 30. The limbs of the spring are located in the slot 12 and they have coil springs 38 provided with lateral terminals suitably anchored as at 40—40 in the side walls or furcations 10—10 of the slot. This is a light tensioned spring and its purpose is to lift up the shank and to normally keep the bill 28 in its secluded weedless position.

The means for overcoming the light tensioned spring 37 takes the form of simple trip means. Specifically, however, it is an inverted U-shaped yoke 41 having arm portions hingedly mounted on the shaft 24 and an angled bight portion 42 which bridges over the shank 30 in a manner to force the shank down and the hook out to its projected position. The means for mechanically releasing and actuating this yoke is sometimes referred to in the art as pull actuated. Specifically, it comprises a push-pull trigger or link 44 which is reciprocable in the hollow portion of the plug as shown in Figures 2 and 6. The rearward end 46 is pivotally connected at 48 between the arms of the yoke 41. The other end portion 50 is slidable through the aperture in the ear 18 where it terminates in the line attaching eye 52. There is a stop shoulder 54 fixed on the link 44 against which the rear end of a coil return spring 56 bears and said spring encircles the link and bears at its opposite end against the ear 18. There is an approximately V-shaped keeper 58 fixedly mounted on the upper edge of the push-pull link 44 and the aforementioned detent or keeper 36 on the latch 34 is engaged normally with this keeper. In addition, there is an inverted U-shaped stirrup 60 and this is fixedly mounted on the walls 22 in the slot 12 in proper relationship to the extension 34 and the extension operates in the stirrup in the manner shown in Figure 6 to limit the upswing of latch 34 and consequently the downswing of the hook 26 when the hook is projected to its useful position.

The normal set or "cocked" state of the lure is shown in Figure 2 wherein it will be observed that the detent 36 of the extension or latch 34 is releasably engaged with the keeper 58. When, as is obvious, the lure is taken by a fish, the action of the jaws of the fish closing upon the fin 32 and plug 8 squeezes these together and thus lifts the detent 36 from the keeper 58 and this action frees the link 44 from its latched state. With the fish exerting a pull on the lure, the fisherman yanks the fishing line (not shown) and the link is slid forwardly relative to the plug 8 and the return spring 56 is consequently contracted. The sliding movement of the link exerts a pull on the rockable yoke 41, whereupon the bight portion 42 of the latter exerts downward pressure on the shank 30. This coaction of the parts forcibly drives the fishhook from the then released position to the projected position (see Figure 6) and the catch is thus made. As soon as the pull on the line and link 44 is relieved, the spring 56 returns the link to the position illustrated in Figure 2 and when the lure is removed from the mouth of the fish, the spring 37 automatically lifts and returns the fishhook to its Figure 2 position, whereupon the detent 36 again engages the keeper 58 and the lure is again automatically set for the next expected catch.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A weedless fishing lure comprising a buoyant plug bifurcated at its trailing end with the furcations defining a receiving and secluding slot for the usual barb portion on a fishhook, a fishhook having a shank pivotally mounted in said slot, spring means supported between the furcations and cooperating with said shank and serving to lift the shank to a position wherein said barb portion is normally housed and secluded in the slot between said furcations, a push-pull link slidably mounted in said plug and having a line attaching eye at one end, and a trip member pivotally mounted between said furcations adjacent to and operatively engageable with the pivoted end of said shank, the adjacent end of said push-pull link being hinged to said trip member so that when said link, by a pull on the line, is slid toward the leading end of the plug, said trip member swings in an arc, engages and then exerts a downwardly applied force on the shank to overcome the retentive lifting force of said spring means, whereby the hook is then swung down and thus projected from its place of seclusion in the slot to an extended as well as exposed fish trapping position below the ventral surface of said plug.

2. The structure defined in claim 1, wherein said push-pull link is provided with a fixed keeper and said shank has a latch-like extension provided with a terminal detent releasably engaging said keeper, in combination with an inverted U-shaped stirrup fixed in said slot between the furcations, the arms of the stirrup straddling said extension and the crotch of the stirrup serving as a stop and limiting the upswing of said extension.

3. The structure defined in claim 2, and a coil return spring carried by said push-pull link and abutting the leading end of said plug and being tensioned thereby.

4. The structure defined in claim 1, wherein said trip member is an inverted U-shaped yoke having its bight portion saddled over said shank.

5. A weedless fishing lure comprising a buoyant plug bifurcated at its trailing end with the furcations defining a hook receiving and secluding slot, a shaft spanning said slot and fixed to said furcations, a fishhook having a shank with its leading end pivotally connected with said shaft, a U-shaped spring in said slot having limbs and a bight portion, said bight portion underlying the shank in a manner to exert a normal but light-tensioned lifting force in said shank and to thus keep the bill of the hook normally secluded in said slot, the limbs of said spring having terminal springy coils respectively anchored in said furcations, an inverted U-shaped yoke having spaced arms hinged on said shaft and a bight portion saddled over said shank so that when said yoke is rocked in a prescribed arc the resisting force of the U-spring is overcome and the hook emerges from seclusion to come into play to penetrate the fish, and a spring-pressed push-pull link mounted for reciprocation in said plug, one end of said link having a line eye and the other end being hingedly connected with the free ends of the arms of said yoke.

6. The structure defined in claim 5, wherein said push-pull link is provided with a fixed keeper and said shank has a latch-like extension provided with a terminal detent releasably engaging said keeper, in combination with an inverted U-shaped stirrup fixed in said slot between the furcations, the arms of the stirrup straddling said extension and the crotch of the stirrup serving as a stop and limiting the upswing of said extension.

References Cited in the file of this patent
UNITED STATES PATENTS

| | | |
|---|---|---|
| 1,021,699 | Nordlund | Mar. 26, 1912 |
| 1,466,616 | Fenner | Aug. 28, 1923 |
| 1,639,766 | Fisher | Aug. 23, 1927 |